(12) United States Patent
Mahalingam et al.

(10) Patent No.: US 12,228,396 B2
(45) Date of Patent: Feb. 18, 2025

(54) CLAMP-ON PRESSURE AND FLOW METERING SYSTEM

(71) Applicant: SAUDI ARABIAN OIL COMPANY, Dhahran (SA)

(72) Inventors: Sakethraman Mahalingam, Aberdeen (GB); Muhammad Arsalan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 315 days.

(21) Appl. No.: 17/653,184

(22) Filed: Mar. 2, 2022

(65) Prior Publication Data

US 2023/0280149 A1 Sep. 7, 2023

(51) Int. Cl.
| | | |
|---|---|---|
| G01B 5/30 | (2006.01) | |
| F16B 2/06 | (2006.01) | |
| G01B 5/00 | (2006.01) | |

(52) U.S. Cl.
CPC .................. G01B 5/30 (2013.01); F16B 2/06 (2013.01); G01B 5/0004 (2013.01)

(58) Field of Classification Search
None
See application file for complete search history.

(56) References Cited

U.S. PATENT DOCUMENTS

| | | | | |
|---|---|---|---|---|
| 3,535,937 A | * | 10/1970 | Bailey | .................. G01L 9/0002 73/862.541 |
| 4,290,311 A | * | 9/1981 | Brewer | ................. G01L 9/0002 73/730 |
| 4,738,140 A | * | 4/1988 | Kempf | .................. G01L 5/1627 73/753 |
| 6,354,147 B1 | | 3/2002 | Gysling et al. | |
| 6,601,458 B1 | | 8/2003 | Gysling et al. | |
| 7,703,331 B2 | * | 4/2010 | Magne | .................. G01L 11/025 73/766 |
| 9,746,386 B2 | * | 8/2017 | Jenkins | ...................... G01L 1/22 |
| 9,823,159 B2 | * | 11/2017 | Huang | ................ G01M 3/2846 |

(Continued)

FOREIGN PATENT DOCUMENTS

| | | | | |
|---|---|---|---|---|
| CN | 102288349 B | | 8/2013 | |
| CN | 104400745 A | * | 3/2015 | ......... B25B 27/0035 |
| CN | 105300802 A | * | 2/2016 | |

(Continued)

OTHER PUBLICATIONS

Denkena, Berend, et al., "Sensor intergration for a hydraulic clamping system", 2nd International Conference on System-Integrated Intelligence: Challenges for Product and Production Engineering, Procedia Technology, vol. 15, 2014, pp. 465-473 (9 pages).

(Continued)

*Primary Examiner* — Daniel S Larkin
(74) *Attorney, Agent, or Firm* — Osha Bergman Watanabe & Burton LLP

(57) ABSTRACT

An apparatus for applying pressure to a pipe and measuring internal pressure. The apparatus including jacket disposed on the pipe, one or more of a first set of strain gauges disposed on a wall of the pipe, one or more of a second set of strain gauges disposed on the wall of the pipe, and a temperature sensor disposed on the wall of the pipe. The pipe has an inner diameter, an outer diameter, and a length.

10 Claims, 4 Drawing Sheets

(56) References Cited

U.S. PATENT DOCUMENTS

2003/0200816 A1 * 10/2003 Francisco, Jr. ....... G01F 1/8468
73/861.18

FOREIGN PATENT DOCUMENTS

| | | | |
|---|---|---|---|
| CN | 105738028 B | 10/2018 | |
| CN | 107505210 B * | 12/2019 | ............... G01N 3/20 |
| CN | 210321843 U | 4/2020 | |
| CN | 210952784 U * | 7/2020 | ............... G01B 7/18 |
| JP | S60252231 A * | 12/1985 | |
| JP | 2008107327 A * | 5/2008 | |
| WO | 2009/056853 A1 | 5/2009 | |

OTHER PUBLICATIONS

Office Action issued in corresponding Saudi Arabian Application No. 123441345; dated May 29, 2024 (8 pages).

* cited by examiner

CLAMP-ON PRESSURE AND FLOW METERING SYSTEM

BACKGROUND

The monitoring of pressure vessels is of great importance in many areas, in particular the oil and gas industry, and in subsea environments where access to the vessels is difficult. A pipeline running at the seabed between an offshore production location to a transportation hub may need to be monitored to provide information regarding the internal and external pressures on the pipe.

Pressure retaining walls on pipes and pressure vessels perform well when the pipe wall remains untampered. However, to measure pressure and flow within a vessel or pipe, a sensor has to be inserted via a hole drilled on the pressure retaining wall. This often means that the wall thickness of the pressure retaining system has to be increased as the hole increases the local stress on the wall of the vessel or pipe. When environmental pressures on the pressure vessel are large, such as in subsea or underground environments, the local stresses on the wall of the vessel or pipe may be even greater.

WO2009/056853 discloses a method for using a clamp and a strain gauge to detect a radial pressure on a pipe. The strain gauge is disclosed as a Bragg sensor, which uses a fiber optic strip, or fiber optic mesh to measure deflection of a light as a force is applied to the sensor. The clamp includes a securing system using a nut and bolt arrangement for applying pressure to the pipe, and the sensor is placed on the clamp surface. A plurality of clamps/sensors are disposed along a length of pipe for measure hoop stress at different intervals. The solution provided by this reference is complex and Bragg sensors are costly to produce, and by locating the sensor on the clamp additional consideration must be taken to account for the additional deflection caused by the hoop stress on the clamp, nut and bolt, and hinges (if used).

SUMMARY

Embodiments herein relate to an apparatus for applying pressure to a pipe and measuring internal pressure. The apparatus including one or more clamps disposed on the pipe and in direct or indirect contact with a wall of the pipe, one or more of a first set of strain gauges disposed on the wall of the pipe, one or more of a second set of strain gauges disposed on the wall of the pipe, and a temperature sensor disposed on the wall of the pipe. The pipe has an inner diameter, an outer diameter, and a length.

Other embodiments herein relate to an apparatus for applying pressure to a pipe and measuring internal pressure. The apparatus including a jacket disposed on the pipe, one or more of a first set of strain gauges disposed on a wall of the pipe, one or more of a second set of strain gauges disposed on the wall of the pipe, and a temperature sensor disposed on the wall of the pipe. The pipe has an inner diameter, an outer diameter, and a length.

Other embodiments herein relate to an method for measuring internal pressure and flow rate within a pipe. The method including disposing a jacket on the pipe in contact with a wall of the pipe, disposing one or more of a first set of strain gauges on the wall of the pipe, disposing one or more of a second set of strain gauges disposed on the wall of the pipe, applying an external force using the jacket, obtaining one or more output values from the one or more of the first set of strain gauges and the one or more of the second set of strain gauges, determining the internal pressure in the pipe based on the one or more output values, and calculating the flow rate in the pipe.

Other aspects and advantages will be apparent from the following Detailed Description and the appended Claims.

DETAILED DESCRIPTION

For the purpose of this description, a single reference number will be assigned to a line as well as a stream carried in that line. Same reference numbers refer to similar components. The person skilled in the art will readily understand that while the design is illustrated referring to one or more specific combinations of features and measures many of those features and measures are functionally independent from other features and measures. Such features and measures may be equally or similarly applied independently in other embodiments or combinations.

In order to address the issues with respect to monitoring pressures within a pipe or pressure vessel, one or more embodiments disclosed herein relate to a system for indirect-contact pressure and flow measurement system that may be clamped on the outside of an existing pipe line without intrusion or breaching the pressure vessel or pipe. The system may use one or more strain gauges, or strain measurement sensors, attached to an outside wall of the pipe. A clamp or pressure jacket may be attached to the pipe, and the clamp or pressure jacket may apply a predetermined pressure to the external wall of the pipe. By measuring the strain on the outer wall of the pipe, it may possible to determine the internal pressure of the pipe without having to breach the pipe. Further, by measuring pressure drop across a given length of pipe, it may possible to estimate the flow rate of the fluid within the pipe without having to breach the pipe or otherwise have the sensor in direct contact with the fluid within the pipe.

According to one or more embodiments, a clamp-on device may be used to measure radial stress on a pipe and through a mathematical model, determine pressure within the pipe and flow rate. The clamp on device may be a one or two piece clamp with a screw mechanism for applying varying external pressure, or may be a sealed jacket which may vary pressure on the pipe using a pump. Using such devices, the internal pressure may be measured without the need to introduce a break on the pressure retaining wall. The clamp-on device may provide a varying external pressure that may be applied over a certain length of the pipe in the longitudinal direction while one or more strain gauges measure the strain on the outside wall of the pipe. Accordingly, one or more embodiments disclosed are directed toward a method to measure the internal pressure without the need to introduce a break on the pressure retaining wall.

Figure 1C:
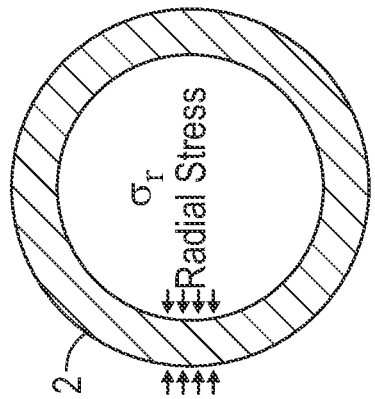
FIG. 1C is a graphical illustration of radial stress on a pipe.
Figure 1B:
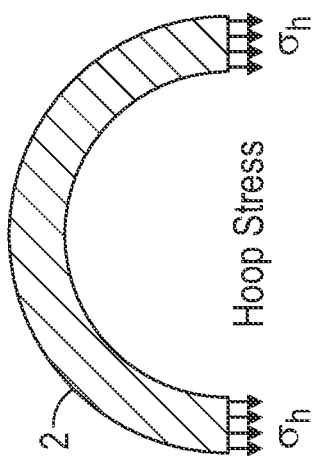
FIG. 1B is a graphical illustration of hoop stress on a pipe.
Figure 1A:
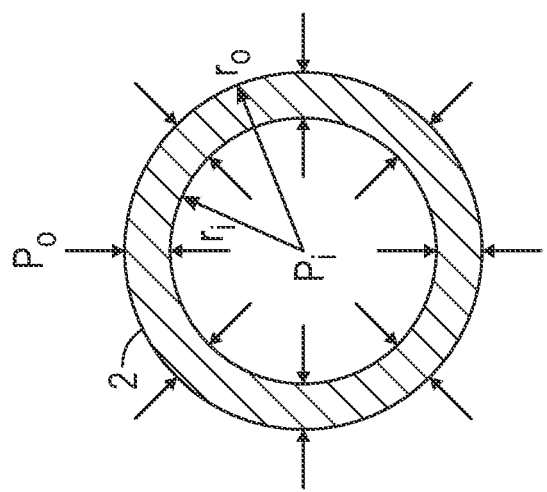
FIG. 1A is graphical illustration of the dimensions of a pipe.

FIGS. 1A-C illustrate the cross-section of the pipe 2 and introduces various terminology for the purposes of this disclosure. In FIG. 1A, the pipe may have an internal radius $r_i$ and external radius $r_o$. The fluid in the pipe will generate an internal pressure $P_i$ and the environmental pressure and clamp-on device collectively will generate an external pressure $P_o$. FIG. 1B illustrates a circumferential stress (also called hoop stress $\sigma_h$) on a pipe and FIG. 1C illustrates radial stress $\sigma_r$ on a pipe. In a pipe, the hoop stress $\sigma_h$ and radial stress $\sigma_r$ are functions of both external and internal pressure.

It is well known from Lame's equations that the hoop and radial stresses at a given radius on the pipe are given by Equation (1) and (2) respectively.

$$\sigma_h = C_1 - \frac{C_2}{r^2} \qquad \text{Eqn. (1)}$$

$$\sigma_r = C_1 + \frac{C_2}{r^2} \qquad \text{Eqn. (2)}$$

Where C1 and C2 are given by Equation 3 and 4 respectively.

$$C_1 = \frac{P_i r_i^2 - P_o r_o^2}{r_o^2 - r_i^2} \qquad \text{Eqn. (3)}$$

$$C_2 = \frac{(P_o - P_i) r_i^2 r_o^2}{r_o^2 - r_i^2} \qquad \text{Eqn. (4)}$$

Applying $r = r_o$ and using Equation (3) and Equation (4) into Equation (1) results in Equation (5).

$$\sigma_h = P_i \frac{2r_i^2}{r_o^2 - r_i^2} - P_o \frac{(r_o^2 + r_i^2)}{r_o^2 - r_i^2} \qquad \text{Equation (5)}$$

Figure 2:
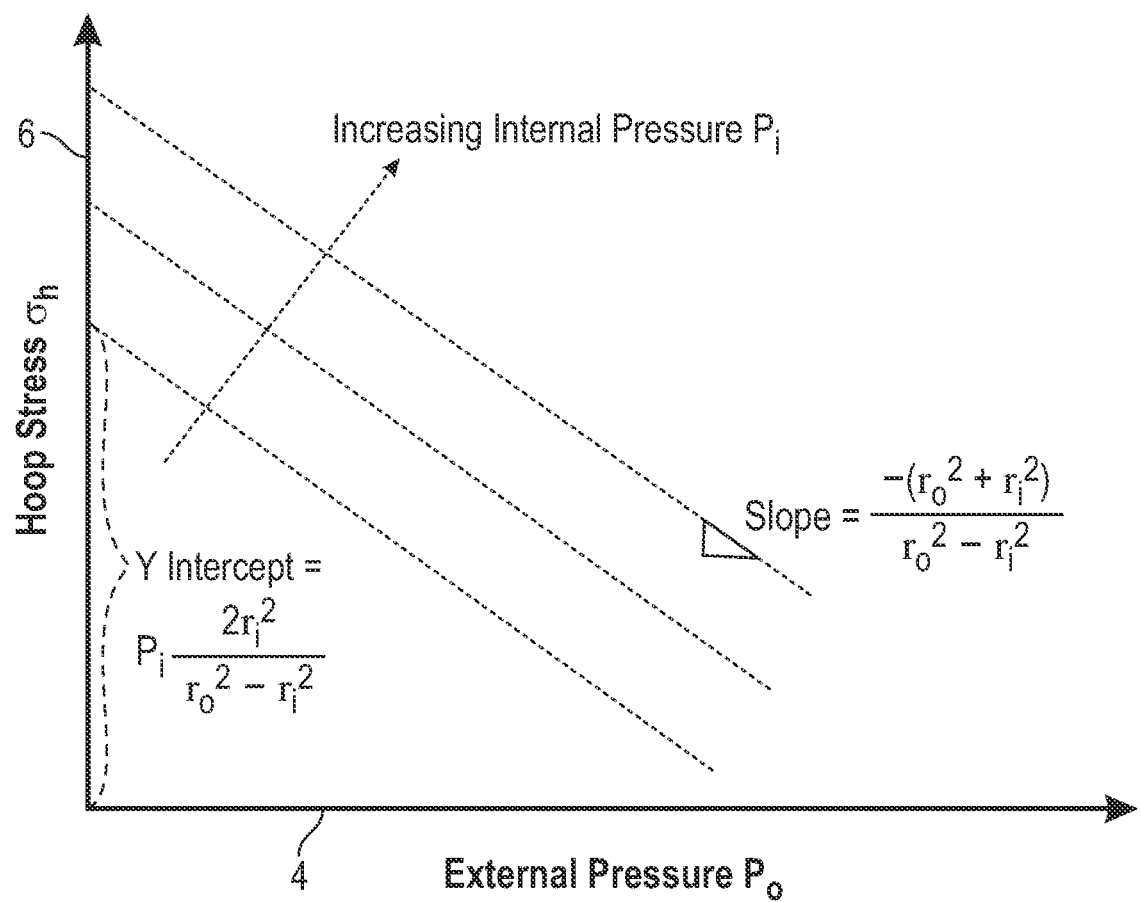
FIG. 2 is a graph of hoop stress as a function of external pressure according to one or more embodiments disclosed.

Equation (5) relates the hoop stress on the outer surface of the pipe ($r = r_o$) as a function of internal and external pressure, $P_i$ and $P_o$, respectively. As shown in FIG. 2, as external pressure 4 increases the hoop stress 6 decreases. The slope of this line is $$\frac{-(r_o^2 + r_i^2)}{r_o^2 - r_i^2}$$

and the intercept on the y-axis is $$P_i \frac{2r_i^2}{r_o^2 - r_i^2}.$$

By varying the external pressure using the clamp-on device and measuring the hoop stress using one or more strain gauges, a straight line relationship between the hoop stress and external pressure may be established. The internal pressure may be calculated from the y-intercept of the curve which is only a function of internal pressure and the internal and external radii, which are known for a given pipe.

However, in order to calculate the internal pressure, the hoop stress must be known. The hoop stress can be calculated by using Equation (6).

$$\sigma_h = E\epsilon_h + \vartheta\sigma_r \qquad \text{Equation (6)}$$

where,
E=Young's modulus of the pipe material,
$\vartheta$=Poisson's Ratio of the pipe material,
$\epsilon_h$=hoop strain,
$\sigma_r = P_o$.

The mechanical properties of the pipe material, such as Young's modulus and Poisson's Ratio, are usually well known as standard qualified materials are used in these applications. The same is true of the inner and outer radii. Setting Equation (5) equal to Equation (6) and substituting $P_o$ for $\sigma_r$ results in Equation (7) results.

$$E\epsilon_h + \vartheta P_o = P_i \frac{2r_i^2}{r_o^2 - r_i^2} - P_o \frac{r_o^2 + r_i^2}{r_o^2 - r_i^2} \qquad \text{Equation (7)}$$

Equation (7) may be used to solve for internal pressure $P_i$ as all the remaining variables are known.

One the internal pressure $P_i$ has been calculated, Equation 8 may be used to calculate the flow rate v of the fluid within the pipe.

$$\frac{\Delta P}{L} = f_d \rho \frac{v^2}{2D} \qquad \text{Equation (8)}$$

where
$\Delta P$=Pressure drop,
L=length of pipe,
$f_d$ is friction factor of the internal surface of the pipe,
$\rho$ is the density of the fluid within the pipe,
v is the velocity of the fluid, and
D is the hydraulic diameter of the pipe (same as the internal diameter for circular cross-section).

$\Delta P$ is calculated as the difference between internal pressure between successive clamp and sensor arrangements. Equation 7 may be used to calculate $P_i$ at a first location ($P_1$) and $P_i$ at a second location ($P_2$), and $\Delta P = P_2 - P_1$.

Figure 3:
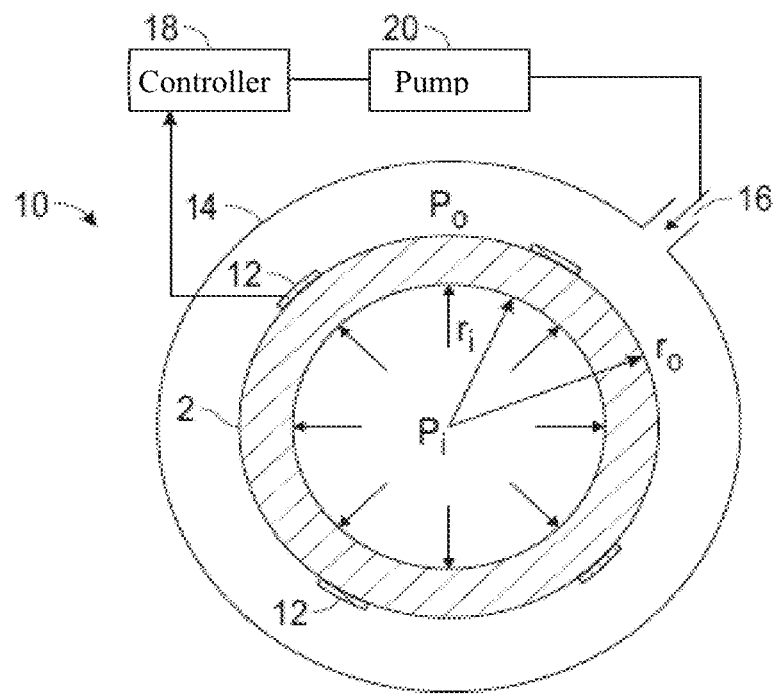
FIG. 3 is an illustration of a clamp-on pressure and flow metering system according to one or more embodiments disclosed.

The method may be performed using a system according to one or more embodiments herein. In one embodiment, as illustrated in FIG. 3, the system 10 may use one or more strain gauges 12 placed around a pipe. The strain gauges 12 may be placed circumferentially around the pipe at 180°, 120°, 90°, or some other angle from 45° to 180° with respect to each other.

Strain gauges may be many different types known in the art. Voltage style strain gauges are made out of material, such as constantan (a copper-nickel alloy), which exhibits a stable increase in voltage resistance with increasing length. Other alloys may be considered for situations where higher temperatures are expected, such as a platinum-tungsten alloy. The gauge may be in the form of a series of wires built onto a polymer film, with or without an adhesive layer, which may easily be fixed to a surface, such as the outside wall of a pipe. Strain gauges of this type are only sensitive to a change in length in one direction. As illustrated in FIG. 3, four strain gauges 12 may be fixed in approximately equal distances around the circumference of the pipe 2. In one or more embodiments, the strain gauges may be aligned such that the direction of the strain gauge is around the circumference of the pipe, or rotated 90° with respect to the longitudinal axis of the pipe. Using the polymer film, the strain gauge may be tightly bonded to the surface of the pipe such that any motion of the pipe is reflected in the strain gauge. As the pipe wall stretches or contracts in the radial direction, the length of the strain gauge changes with the circumference of the pipe wall. As the length of the strain gauge changes with the expansion and contract of the pipe wall, the length of the metal alloy wires in the gauge change and produce a higher or lower voltage resistance. By measuring the change in resistance, the hoop strain is determined as described previously.

Another type of strain gauge that may be used to determine hoop strain is a Bragg sensor. Such sensors may be a fiber-optic cable with Bragg gratings around the outer wall of the pipe. Bragg gratings are made by inscribing periodic/aperiodic variations of refractive index in the core of the fiber which cause refractions when light is sent down the fiber. The fiber locations with the gratings are adhered to the outer surface of the pipe. The gratings will expand and contract with the pipe wall, just as the voltage style strain. Strain causes a change in wavelength of the refracted light and from a change in the wavelength, the hoop strain may be determined. Bragg sensors, unlike voltage style strain gauges, are costly to manufacture and are more difficult to calibrate.

Figure 4:
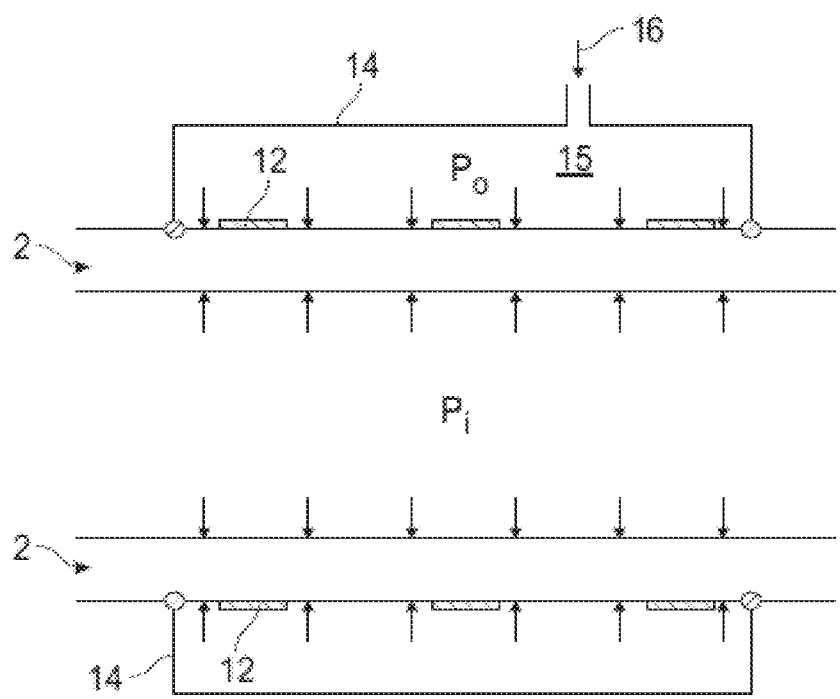
FIG. 4 is an illustration of a clamp-on pressure and flow metering system according to one or more embodiments disclosed.

Referring now to FIG. 4, a cross-section of the pipe 2 and sealed jacket 14 taken along the longitudinal axis is illustrated. The section of pipe 2 with the one or more strain gauges 12 is wrapped with two half-circle sections of a sealed jacket 14 and the annular space 15 between the pipe 2 and sealed jacket 14 is filled with a working fluid 16. The jacket 14 may be sealed against the pipe with a first seal located at a first terminal end of the jacket 14 and a second seal located at a second terminal end of the jacket 14 opposite the first terminal end. In one or more embodiments, instead of a pipe-over-pipe structure with sealed ends, the sealed jacket 14 may be an inflatable cuff filled with a working fluid. This sealed jacket filled with a fluid may be used to control the external pressure $P_o$ on the pipe along the length. For example, in an embodiment where the sealed jacket is a pipe-over-pipe structure, the working fluid 16 may apply a pressure to the outside of the pipe 2. In embodiments where the sealed jacket is an inflatable cuff structure, the working fluid in the inflatable cuff will cause an increase in the pressure in the cuff, causing an increase in pressure on the pipe 2.

The length of the sealed jacket may be from 3 to 20 times the outer diameter of the pipe 2, and the diameter of the sealed jacket may be from just larger than the diameter of the pipe 2 to 1.5 times the diameter of the pipe 2. As illustrated in FIG. 3, the one or more strain gauges 12 may produce an output signal which may be received by a controller 18. The strain gauge may be set up as a Wheatstone bridge, which is known to those skilled in the art. The output signal of the Wheatstone bridge may be a voltage or resistance which is different than the steady state voltage or resistance of the strain gauge. The controller 18 may be in communication with a pump 20 that may increase or decrease the pressure of the working fluid 16 in the annular space 15. In one or more embodiments, the working fluid 16 may be air, water, or dielectric oil. Such fluids may not interfere with the voltage output of the strain gauge.

Returning to FIG. 4, strain gauges 12 are placed at regular intervals along the length of the pipe 2. By using multiple strain gauges 12 along the length of the pipe 2, the pressure drop across that length may be determined. In one or more embodiments, two or more strain gauges 12 may be located on the same side of pipe 2 at a distance from 1 to 15 times the outer diameter of the pipe 2, such as from 1 to 10 times the outer diameter of the pipe 2 or from 1 to 5 times the outer diameter of the pipe 2. In one or more embodiments, the length of a clamp on apparatus, which may have one or more strain gauges, may have a length from 10 to 15 times the outer diameter of the pipe 2, with successive clamp on apparatuses being disposed at a distance of from 100 to 1000 times the outer diameter of the pipe 2. In either embodiment, a series of strain gauges 12 may be placed at regular or irregular intervals around the circumference of the pipe 2, such as at 180°, 120°, 90°, or some angle from 45° to 180° with respect to each other. Such embodiments may allow for greater accuracy or granularity of the relative change in hoop stress along the length of the pipe 2. The sealed jacket 14 may be placed on the pipe 2 such that the totality of strain gauges 12 placed along a section of pipe are located within the annular space 15.

In one or more embodiments, the set of strain gauges oriented such that the strain gauges measure expansion and contraction in the radial direction may be a first set of one or more strain gauges. A second set of one or more strain gauges may be disposed along the length of the pipe in a similar fashion to the first set of one or more strain gauges. The second set of strain gauges, however, may be disposed such that the second set of strain gauges measures expansion and contraction in a longitudinal direction of the pipe. In other words, the second set of strain gauges are disposed at an angle of 0° with respect to the longitudinal axis. The second set of strain gauges may also be located in the annular region between the pipe and sealed jacket. The output signal of the second set of strain gauges may be used in conjunction with the output signal of the first set of strain gauges to more accurately determine the total stress on the system, and thus more accurately determine the internal pressure.

In one or more embodiments, a third set of strain gauges may be disposed along the length of the pipe similar to the first or second set of strain gauges. The third set of strain gauges may be disposed at an angle of 45° with respect to the longitudinal direction. Such a third set of strain gauges may be used to determine strain in both the longitudinal and radial directions by using the sine and cosine components of the output signal. The third set of strain gauges may be used by themselves, or in combination with the first set of strain gauges, the second set of strain gauges, or both.

Strain gauges, such as those described previously, may be sensitive to temperature. The temperature of the outer wall of the pipe may be measured using a resistance thermometer or a thermocouple. The controller may then compensate the measurement of the internal pressure based on the measured temperature. For example, strain gauges typically come with a datasheet providing calibration on the change in resistance of the strain gauge with respect to change in temperature. When the strain gauges are attached to the pipe, the temperature is measured and logged. The temperature may be used as the reference temperature. When the temperature of the pipe changes with time, the thermal strain is calculated from the difference between the measured temperature and the reference temperature.

Figure 5:
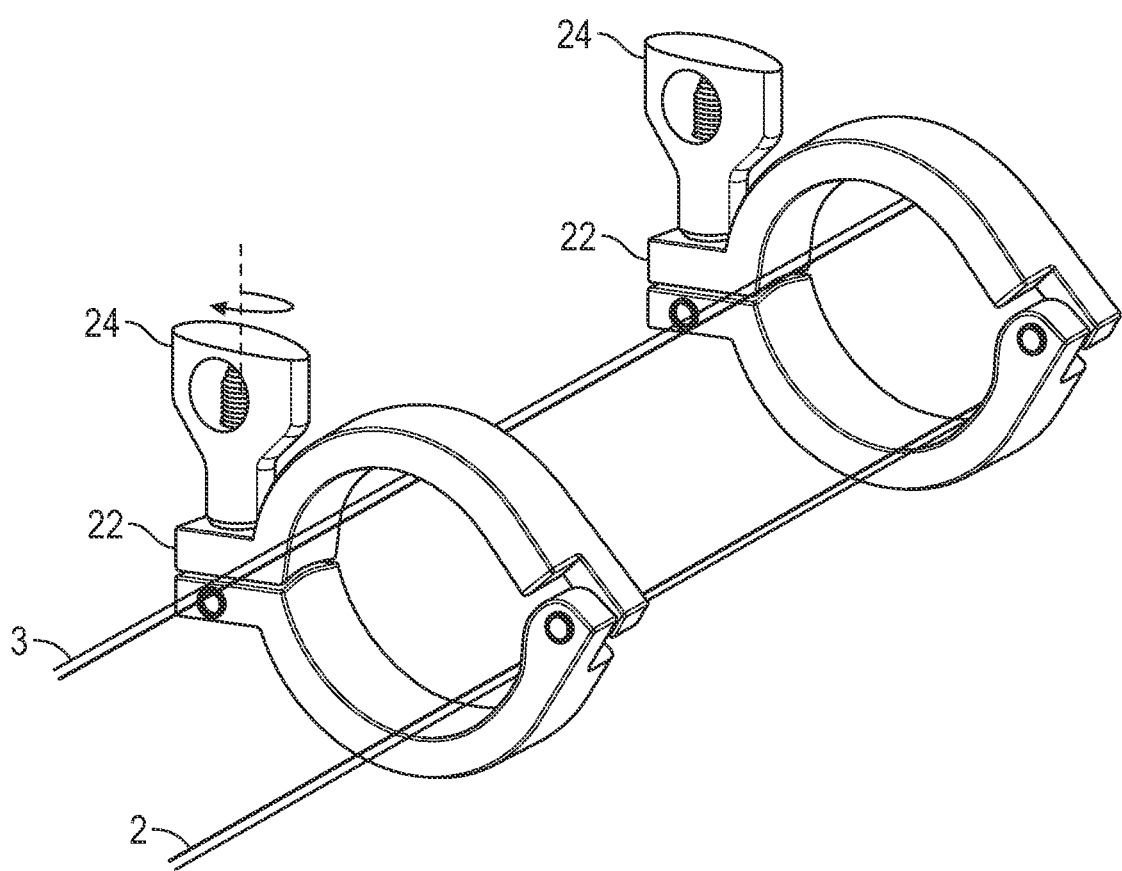
FIG. 5 is an illustration of a clamp-on pressure and flow metering system according to one or more embodiments disclosed.

In one or more embodiments as illustrated in FIG. 5, one or more metal clamps 22 may be placed around the section of pipe 2 where the strain gauges are disposed. The one or more clamps may be placed at a distance of 1 to 5 times the outer diameter of the pipe. The one or more clamps 22 may be used to increase or decrease the external pressure, or clamping force, on the pipe. The clamping force on the pipe may be controlled by a screw or wingnut 24 holding the clamp together. A stepper motor (not illustrated) or similar device may be in communication with the controller. The controller may send a signal to the stepper motor to increase or decrease the clamping force on the pipe in response to the output signal from the one or more strain gauges.

In one or more embodiments, a two-piece sleeve 3 may be placed along the length of pipe where the one or more clamps 22 are disposed. The one or more strain gauges may be located between the pipe 2 and the sleeve 3. The sleeve 3 may be used to spread the clamping force of the one or more clamps 22 over a longer distance of the pipe.

In the embodiments with the one or more clamps 22, with or without the sleeve 3, the strain measurement and controller features remain the same. In these embodiments, the controller is managing the precise amount of external pressure on the pipe by controlling the extent to which the screw or wingnut is turned on the one or more clamps. The sleeve may be made of a material with sufficient strength to withstand the force applied by the clamp and transmit it to the pipe wall. In one or more embodiments, the sleeve may be a material similar to, or stronger than, the pipe material.

In one or more embodiments, the pipe may be disposed in a subsea environment. One of ordinary skill in the art will readily appreciate that the pressure of a subsea environment increases linearly with increasing depth. Accordingly, strain gauges, such as those disclosed, may be placed at regular intervals along the height of a subsea riser assembly. The inherent change in external pressure along the height of the riser may negate the need for the clamp-on devices as disclosed herein and may still allow for the determination of internal pressure and flow rate of the fluid within the riser without the need for breaching the pipe wall. However, the application of additional external pressure may provide more flexibility to the measurement system. The pressure applied to the riser at a given height may also change based on salinity of water, temperature of the water, and ocean currents. The clamp on apparatus may also be used on pipelines where other sources of preexisting external pressure exist, such as cement anchor blocks or in dirt filled trenches.

As opposed to systems disclosed in the prior art, the present description uses voltage-type strain gauges disposed directly on the pipe surface. This arrangement has the advantage in that the strain gauges measure the hoop stress of the pipe wall directly without having to account for the additional hoop stresses added by the clamp. The voltage-type strain gauges are also less costly than the Bragg sensors. This may allow for more strain gauges to be placed on a given length of pipe, thereby increasing resolution of the measurements and accuracy.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112 (f) for any limitations of any of the claims herein, except for those in which the claim expressly uses the words "means for" or "step for" together with an associated function.

What is claimed is:

1. An apparatus configured for applying pressure to a pipe and measuring internal pressure, comprising:
    one or more clamps disposed on the pipe and in direct or indirect contact with a wall of the pipe;
    one or more of a first set of strain gauges disposed on an outside surface of the wall of the pipe at an equal distance around a circumference of the pipe;
    one or more of a second set of strain gauges disposed on the wall of the pipe at a lateral position corresponding to the one or more strain gauges and at an angle of 0° with respect to a longitudinal axis of the pipe,
    wherein each clamp of the one or more claims is disposed circumferentially around a location along the pipe corresponding to the location the first set of strain gauges and the second set of strain gauges; and
    a temperature sensor disposed on the wall of the pipe at a lateral position corresponding to the first set of strain gauges and the second set of strain gauges;
    where the pipe has an inner diameter, an outer diameter, and a length; and
    wherein the temperature sensor measures the temperature of the wall of the pipe.

2. The apparatus as claimed in claim 1, further comprising a sleeve disposed between the wall of the pipe and the one or more clamps, the sleeve configured for spreading out a clamping force applied by the one or more clamps.

3. The apparatus as claimed in claim 1, where a first of the one or more clamps is disposed at a length of 1 to 5 times the outer diameter from a second of the one or more clamps along the length of the pipe.

4. The apparatus as claimed in claim 1, where a first of the one or more of the first set of strain gauges is disposed at a length of 1 to 15 times the outer diameter from a second of the one or more of the first set of strain gauges.

5. The apparatus as claimed in claim 4, where the one or more of the first set of strain gauges is disposed in a radial direction with respect to the pipe.

6. The apparatus as claimed in claim 1, where a first of the one or more of the second set of strain gauges is disposed at a length of 1 to 15 times the outer diameter from a second of the one or more of the second set of strain gauges.

7. The apparatus as claimed in claim 6, where the one or more of the second set of strain gauges is disposed in a direction longitudinally with respect to the pipe.

8. The apparatus as claimed in claim 1, where the one or more clamps further comprising a wingnut that is rotated to increase or decrease a clamping pressure on the pipe.

9. The apparatus as claimed in claim 8, further comprising a controller configured for obtaining one or more output values from the one or more of the first set of strain gauges and the one or more of the second set of strain gauges disposed on the pipe.

10. The apparatus as claimed in claim 9, further comprising a stepper motor configured for rotating the wingnut in response to the one or more output values.

\* \* \* \* \*